United States Patent
Naka et al.

(10) Patent No.: US 10,120,264 B2
(45) Date of Patent: Nov. 6, 2018

(54) TERAHERTZ WAVE GENERATOR

(71) Applicant: SHIBUYA CORPORATION, Kanazawa-shi, Ishikawa (JP)

(72) Inventors: Toshiaki Naka, Kanazawa (JP); Motoi Sasaki, Kanazawa (JP); Akito Tsuchiya, Kanazawa (JP)

(73) Assignee: SHIBUYA CORPORATION, Kanazawa-shi, Ishikawa (JP)

( * ) Notice: Subject to any disclaimer, the term of this patent is extended or adjusted under 35 U.S.C. 154(b) by 0 days.

(21) Appl. No.: 15/815,096

(22) Filed: Nov. 16, 2017

(65) Prior Publication Data

US 2018/0149946 A1 May 31, 2018

(30) Foreign Application Priority Data

Nov. 30, 2016 (JP) .................. 2016-233334

(51) Int. Cl.
*G02F 1/35* (2006.01)
*G02F 1/355* (2006.01)
*G02F 1/39* (2006.01)

(52) U.S. Cl.
CPC .............. *G02F 1/39* (2013.01); *G02F 1/3501* (2013.01); *G02F 1/3534* (2013.01); *G02F 1/3551* (2013.01); *G02F 2001/3503* (2013.01); *G02F 2203/13* (2013.01)

(58) Field of Classification Search
CPC ................. G02F 1/3534; G02F 1/3551; G02F 2001/353; G02F 2203/13
See application file for complete search history.

(56) References Cited

U.S. PATENT DOCUMENTS

| 5,841,570 A * | 11/1998 | Velsko ...................... G02F 1/39 359/330 |
| 6,903,341 B2 * | 6/2005 | Imai .......................... G02F 1/39 250/340 |
| 7,599,409 B2 * | 10/2009 | Nishizawa ............ G02F 1/3534 372/20 |
| 8,564,875 B2 * | 10/2013 | Kawada ................ G02F 1/3534 250/504 R |
| 9,897,893 B2 * | 2/2018 | Kawase ................ G02F 1/3501 |
| 2017/0102604 A1 * | 4/2017 | Ebrahim-Zadeh ........ G02F 1/39 |
| 2018/0031469 A1 * | 2/2018 | Aiko ................... G01N 21/3581 |

FOREIGN PATENT DOCUMENTS

JP            3747319 B2    10/2003

* cited by examiner

*Primary Examiner* — Rhonda S Peace

(74) *Attorney, Agent, or Firm* — Flynn Thiel, P.C.

(57) ABSTRACT

A pumping beam L1 is caused to be incident on an end surface 4A of a nonlinear crystal 4, and a seed beam L2, the diameter of which is increased by a concave lens 6, is collected and adjusted into a collimated beam by a convex lens 7 and caused to be incident on the end surface 4A described above. The pumping beam L1 and the seed beam L2 are caused to be incident on the end surface 4A with the pumping beam L1 and the seed beam L2 superimposed on each other, whereby the nonlinear crystal 4 generates a terahertz wave TH.

1 Claim, 3 Drawing Sheets

TERAHERTZ WAVE GENERATOR

BACKGROUND OF THE INVENTION

Field of the Invention

The present invention relates to a terahertz wave generator, and more particularly to a terahertz wave generator in which a diameter of a seed beam to be incident on a nonlinear crystal is increased to be capable of generating a terahertz wave having an increased intensity.

Description of the Related Art

Conventionally, a terahertz wave generator has been known. Specifically, there is a known terahertz wave generator including a nonlinear crystal capable of generating a terahertz wave on the basis of a parametric effect, a pumping beam emitter that emits a pumping beam, a seed beam emitter that emits a seed beam, and a convex lens that is disposed on the optical path of the seed beam and collects the seed beam. In the terahertz wave generator, the pumping beam and the seed beam described above are caused to be incident on the nonlinear crystal so as to be superimposed thereon to cause the nonlinear crystal to generate a terahertz wave (see Japanese Patent No. 3,747,319, for example).

In the terahertz wave generator of related art described in Japanese Patent No. 3,747,319, a pumping beam L1 is caused to be incident on an end surface 4A of a nonlinear crystal 4, and a seed beam L2 collected by a convex lens 7 is caused to be incident on the end surface 4A of the nonlinear crystal 4 so that the seed beam L2 is superimposed on the pumping beam L1 at the same time, whereby the nonlinear crystal 4 generates a terahertz wave TH, as shown in FIG. 3 in a simplified manner.

In the terahertz wave generator of the related art, however, the diameter of the seed beam L2 incident on the end surface 4A of the nonlinear crystal 4 is about 0.1 mm, and the area where the seed beam L2 and the pumping beam L1 are superimposed on each other on the end surface 4A is therefore small, undesirably resulting in a problem of a low intensity of the terahertz wave TH generated by the nonlinear crystal 4.

SUMMARY OF THE INVENTION

In view of the circumstances described above, the present invention relates to a terahertz wave generator including a nonlinear crystal capable of generating a terahertz wave based on a parametric effect, a pumping beam emitter that emits a pumping beam, a seed beam emitter that emits a seed beam, and a convex lens that is disposed on an optical path of the seed beam and collects the seed beam, the terahertz wave generator being configured so that the pumping beam and the seed beam are caused to be incident through an end surface of the nonlinear crystal to cause the nonlinear crystal to generate a terahertz wave, the terahertz wave generator being characterized in that a concave lens is provided on the optical path of the seed beam, and the seed beam's diameter, which is increased by the concave lens, is caused to be incident on the nonlinear crystal so as to be superimposed on the pumping beam on the end surface.

According to the configuration described above, the area where the seed beam and the pumping beam incident on the nonlinear crystal are superimposed on each other can be increased, whereby the intensity of the terahertz wave TH generated by the nonlinear crystal can be higher than the intensity of the terahertz wave generated by the terahertz wave generator of related art.

DETAILED DESCRIPTION OF THE PREFERRED EMBODIMENTS

Figure 1:
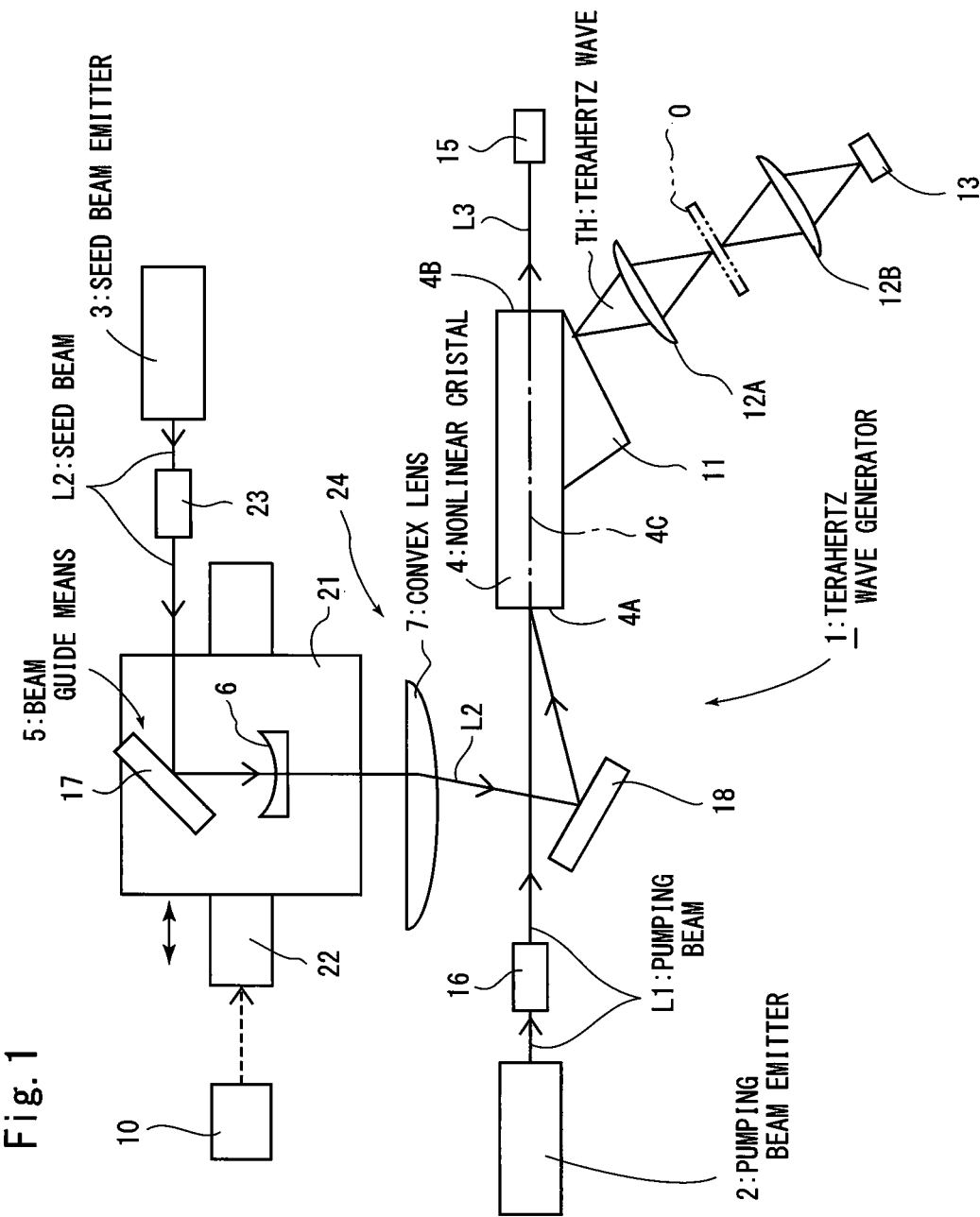
FIG. 1 is a plan view showing the configuration of an embodiment according to the present invention.

The present invention will be described below with reference to embodiments shown in the drawings. In FIG. 1, reference numeral 1 denotes a terahertz wave generator that generates a terahertz wave TH, and the terahertz wave generator 1 is configured to allow the inspection of the quality of an inspection target object O by using the generated terahertz wave TH.

The terahertz wave generator 1 includes a pumping beam emitter 2, which emits a pumping beam L1, a seed beam emitter 3, which emits a seed beam L2, a nonlinear crystal 4, which generates the terahertz wave TH and an idler wave L3 when the seed beam L2 and the pumping beam L1 are incident on an end surface 4A with the seed beam L2 and the pumping beam L1 superimposed on each other, beam guide means 5 for successively reflecting the seed beam L2 emitted from the seed beam emitter 3 to guide the seed beam L2 to the nonlinear crystal 4, a concave lens 6, which is disposed on the optical path of the seed beam L2 and increases the diameter of the seed beam L2, and a convex lens 7, which is disposed on the optical path of the seed beam L2 and collects the seed beam L2, the diameter of which has been increased by the concave lens 6.

The terahertz wave generator 1 is configured as an injection-seeded type terahertz parametric generator (Is-TPG) in which the seed beam L2 and the pumping beam L1 are caused to be incident on the nonlinear crystal 4 described above with the seed beam L2 and the pumping beam L1 satisfying the phase matching condition and superimposed on each other to cause the nonlinear crystal generate the idler wave L3 and the terahertz wave TH.

The nonlinear crystal 4 is formed in a rectangular columnar shape, and a holder that is not shown fixes the nonlinear crystal 4 in such a way that the center axis 4C thereof horizontally extends at a predetermined height. A silicon prism 11 is attached to and integrated with a side surface of the nonlinear crystal 4.

A pair of convex lenses 12A and 12B are arranged along the optical path of the terahertz wave TH radiated outward from the nonlinear crystal 4 via the silicon prism 11 with the convex lenses 12A and 12B separate from each other, and a receiver 13 is disposed in an outer position facing the outer convex lens 12B.

At the time of inspection, the inspection target object O is placed in the middle position between the pair of convex lenses 12A and 12B, and when the inspection target object O is irradiated with the terahertz wave TH for inspection, the terahertz wave TH having passed through the inspection target object O is received with the receiver 13. An evaluation apparatus that is not shown evaluates whether or not the quality of the inspection target object O is accepted on the basis of the terahertz wave TH received with the receiver 13.

The pumping beam emitter 2 is disposed and fixed in a position on the extension from one end of the center axis 4C of the nonlinear crystal 4, and a damper 15 is disposed and fixed in a position on the extension from the other end of the center axis 4C of the nonlinear crystal 4. The pumping beam L1 and the idler wave L3 having passed through the nonlinear crystal 4 and having been radiated outward through an end surface 4B are absorbed by the damper 15.

The pumping beam emitter 2 is formed of a microchip laser, and the operation of the pumping beam emitter 2 is controlled by a controller 10. The pumping beam emitter 2 is horizontally supported so as to be flush with the nonlinear crystal 4 with the pumping beam emitter 2 separate from an end surface 4A of the nonlinear crystal 4.

When the pumping beam emitter 2 is operated, a pulsed laser as the pumping beam L1 is emitted toward the nonlinear crystal 4, and the pumping beam L1 emitted in the form of pulses is caused to be incident at the center of the end surface 4A of the nonlinear crystal 4 (position where center axis 4C of nonlinear crystal 4 intersects end surface 4A). The pulsed laser as the pumping beam L1 has a wavelength of 1064.4 nm, a pulse emission repetition frequency of 400 psec. A collimator 16 is disposed on the optical path of the pumping beam L1, and the pumping beam L1 is adjusted by the collimator 16 into a collimated beam. That is, the pumping beam L1 is adjusted by the collimator 16 into a collimated beam and then caused to be incident on the end surface 4A.

The convex lens 7 is disposed and fixed on one side of the optical path of the pumping beam L1 (left with respect to radiation direction) emitted from the pumping beam emitter 2. The seed beam L2 emitted from the seed beam emitter 3 is collected by the convex lens 7 as a collecting lens and caused to be incident at the center of the end surface 4A of the nonlinear crystal 4 (position where center axis 4C of nonlinear crystal 4 intersects end surface 4A).

The pumping beam L1 and the seed beam L2 are not necessarily applied to the position where the center axis 4C intersects the end surface 4A and only need to be incident on the end surface 4A with the pumping beam L1 and the seed beam L2 superimposed on each other.

The controller 10 can be a personal computer (PC) or a programmable logic computer (PLC). As the pumping beam emitter 2 described above, an ultrashort pulse laser may be used in place of a microchip laser.

The seed beam emitter 3 is horizontally fixed so as to be parallel to the longitudinal direction of the nonlinear crystal 4 described above at the predetermined height, and the seed beam L2 emitted from the seed beam emitter 3 is successively reflected off the beam guide means 5, which is formed of a first total reflection mirror 17 and a second total reflection mirror 18, and then caused to be incident on the end surface 4A of the nonlinear crystal 4. In the present embodiment, the optical path of the pumping beam L1 immediately after it is emitted from the pumping beam emitter 2 described above and the optical path of the seed beam L2 immediately after it is emitted from the seed beam emitter 3 are parallel to each other, and the emission direction of the seed beam L2 emitted from the seed beam emitter 3 is opposite to the emission direction of the pumping beam L1 emitted from the pumping beam emitter 2.

The seed beam emitter 3 is formed of a semiconductor laser, and the operation of the seed beam emitter 3 is controlled by the controller 10. When the seed beam emitter 3 is operated, the seed beam L2 is continuously emitted. The optical path of the seed beam L2 immediately after it is emitted is parallel to the center axis 4C of the nonlinear crystal 4 and horizontally extend. In the present embodiment, the laser as the seed beam L2 is emitted from the seed beam emitter 3 so that the wavelength of the laser changes over a range from 1068 to 1075 nm. Changing the wavelength of the seed beam L2 over the range described above allows the emitted terahertz wave TH to have a frequency ranging from 0.8 to 3 THz.

The first total reflection mirror 17 is held by a movable stage 21 and inclined by 45° with respect to the emission direction of the seed beam L2 emitted from the seed beam emitter 3. Having been emitted from the seed beam emitter 3, the seed beam L2 is reflected off the first total reflection mirror 17 at an angle of reflection of 90°.

The second total reflection mirror 18 is disposed and fixed in a predetermined position on the side opposite the first total reflection mirror 17 with respect to the optical path of the pumping beam L1 emitted from the pumping beam emitter 2. The second total reflection mirror 18 is maintained so as to incline by a predetermined angle with respect to the optical path of the seed beam L2 reflected off the first total reflection mirror 17. More specifically, the inclination angle of the second total reflection mirror 18 with respect to the rightward/leftward direction in FIG. 1, which is assumed to be 0°, ranges from about 1 to 2°. The seed beam L2 reflected off the first total reflection mirror 17 is therefore reflected off the second total reflection mirror 18 and then caused to be incident at the center of the end surface 4A of the nonlinear crystal 4 at an angle of incidence that satisfies the phase matching condition.

The concave lens 6 and the convex lens 7 are sequentially arranged from the upstream side of the optical path of the seed beam L2 on the optical path between the first total reflection mirror 17 and the second total reflection mirror 18. The concave lens 6 and the convex lens 7 are disposed so as to be perpendicular to the optical path of the seed beam L2, and the convex lens 7 is fixed to a support member that is not shown. The convex lens 7 is supported in a predetermined position that allows the focal position of the convex lens 7 to coincide with the position of the end surface 4A of the nonlinear crystal 4 described above. On the other hand, the concave lens 6 is supported in a predetermined position on the movable stage 21 described above.

In the present embodiment, the concave lens 6 and the first total reflection mirror 17 are provided on the movable stage 21, and the diameter of the seed beam L2 reflected off the first total reflection mirror 17 is increased by the concave lens 6. Thereafter, the seed beam L2, the diameter of which has been increased, is collected and adjusted into a collimated beam by the convex lens 7, reflected off the second total reflection mirror 18 described above, and caused to be incident on the end surface 4A of the nonlinear crystal 4.

The movable stage 21 that holds the first total reflection mirror 17 and the concave lens 6 is configured to be movable in the horizontal direction along the optical path of the seed beam L2 immediately after it is emitted from the seed beam emitter 3, and the movable stage 21 is moved by a movement mechanism 22 along the optical path of the seed beam L2 in the rightward/leftward direction in FIG. 1. The operation of the movement mechanism 22 is controlled by the controller 10.

A collimator 23 is disposed on the optical path of the seed beam L2 between the seed beam emitter 3 and the first total reflection mirror 17, and the collimator 23 adjusts the seed beam L2 immediately after it is emitted from the seed beam emitter 3 into a collimated beam.

When the seed beam L2 is emitted from the seed beam emitter 3, the seed beam L2 is adjusted by the collimator 23 into a collimated beam, reflected off the first total reflection mirror 17 by 90°, and passes through the concave lens 6 and the convex lens 7.

In the present embodiment, when the controller 10 causes the movement mechanism 22 to move the movable stage 21 along the optical path of the seed beam L2 at a required point of time by a required amount in the horizontal direction, the angle of incidence of the seed beam L2 incident on the convex lens 7 can be changed, whereby the angle of incidence of the seed beam L2 to be incident on the end surface 4A of the nonlinear crystal 4 can be changed.

In the present embodiment, the first total reflection mirror 17 and the second total reflection mirror 18 are each a total reflection mirror that totally reflects a beam, but the mirrors 17 and 18 may instead each be a partially transmissive mirror. In this case, the seed beam L2 having passed through the mirrors 17 and 18 may be caused to be incident on an emitter monitor that measures the intensity of the laser.

When the pumping beam L1 and the seed beam L2 are caused to be incident at the center (center axis 4C) of the end surface 4A of the nonlinear crystal 4 with the pumping beam L1 and the seed beam L2 satisfying the phase matching condition and superimposed on each other, the nonlinear crystal 4 generates the terahertz wave TH, which is radiated outward via the prism 11. At this point, the idler wave L3 is radiated outward through the end surface 4B of the nonlinear crystal 4.

As described above, the beam guide means 5 in the present embodiment is formed of the first total reflection mirror 17 and the second total reflection mirror 18. Further, the beam guide means 5, the concave lens 6, the convex lens 7, and the movement mechanism 22 form seed beam irradiation means 24 for irradiating the end surface 4A of the nonlinear crystal 4 with the seed beam L2.

As described above, in the present embodiment, the seed beam emitter 3 is disposed so as to be parallel to the longitudinal direction of the nonlinear crystal 4, and the beam guide means 5 deflects the seed beam L2, and causes the seed beam L2 to be incident on the end surface 4A of the nonlinear crystal 4. The diameter of the seed beam L2 is increased by the concave lens 6, and the seed beam L2 is collected and adjusted into a collimated beam by the convex lens 7 and then caused to be incident on the end surface 4A of the nonlinear crystal 4. The movement mechanism 22 described above causes the movable stage 21 to move the first total reflection mirror 17 and the concave lens 6 along the optical path of the seed beam L2.

In the configuration described above, the terahertz wave TH generated by the terahertz wave generator 1 is used to inspect the inspection target object O as follows:

The inspection target object O is first placed in an inspection position between the pair of convex lenses 12A and 12B.

The controller 10 then causes the movement mechanism 22 to move the first total reflection mirror 17 and the concave lens 6 along with the movable stage 21 by a required amount in the horizontal direction in accordance with the wavelength of the terahertz wave TH with which the inspection target object O is irradiated. As a result, the first total reflection mirror 17 is located in a position corresponding to the wavelength of the terahertz wave TH with which the inspection target object O is irradiated.

The controller 10 then activates the pumping beam emitter 2 and the seed beam emitter 3. The pumping beam emitter 2 therefore emits the pumping beam L1 in the form of pulses, and the pumping beam L1 is adjusted by the collimator 16 into a collimated beam and caused to be incident at the center of the end surface 4A of the nonlinear crystal 4. The seed beam emitter 3 emits the seed beam L2 having a wavelength corresponding to the wavelength of the terahertz wave TH applied onto the inspection target object O, and the seed beam L2 is reflected off the first total reflection mirror 17 by 90°, and seed beam L2, the diameter of which is increased by the concave lens 6, is then collected and adjusted into a collimated beam by the convex lens 7, reflected off the second total reflection mirror 18, and caused to be incident at the center of the end surface 4A of the nonlinear crystal 4.

Since the first total reflection mirror 17 is located in the required position according to the wavelength of the seed beam L2 described above, the phase matching condition is satisfied, and the pumping beam L1 and the seed beam L2 are simultaneously incident on the end surface 4A described above with the pumping beam L1 and the seed beam L2 superimposed on each other. As a result, the terahertz wave TH is generated, and the idler wave L3 is also generated.

Figure 2:
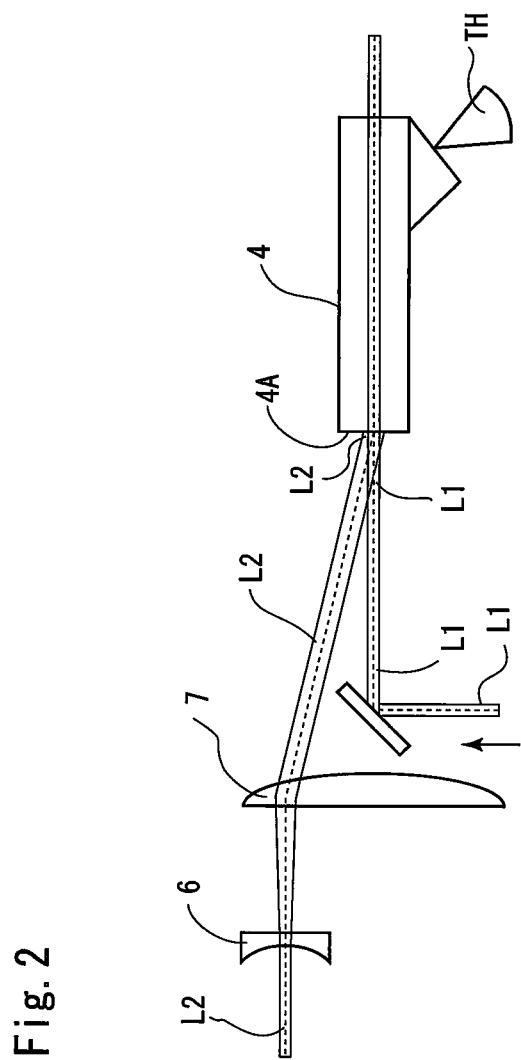
FIG. 2 is a configuration diagram showing the principle of key parts in the embodiment shown in FIG. 1.

Now, as shown in FIG. 2 in principle, in the present embodiment, after the diameter of the seed beam L2 is increased by the concave lens 6, the seed beam L2 is collected and adjusted into a collimated beam by the convex lens 7 and then caused to be incident at the center of the end surface 4A. The diameter of the seed beam L2 incident on the end surface 4A is therefore increased as compared with the diameter of the seed beam L2 in the terahertz wave generator of related art shown in FIG. 3, whereby the area where the pumping beam L1 and the seed beam L2 are superimposed on each other on end surface 4A can be increased, and the intensity of the terahertz wave TH generated by the nonlinear crystal 4 is higher than the intensity of the terahertz wave generated by the terahertz wave generator of related art accordingly.

The terahertz wave TH generated by the nonlinear crystal 4 is radiated outward via the silicon prism 11 and then applied onto the inspection target object O via the convex lens 12A. The terahertz wave TH having been applied onto the inspection target object O and having passed therethrough is received with the receiver 13 via the convex lens 12B. An evaluation apparatus, which is not shown, evaluates whether or not the inspection target object O is accepted on the basis of the terahertz wave TH received with the receiver 13. The pumping beam L1 and the idler wave L3 radiated through the other end surface 4B of the nonlinear crystal 4 are absorbed by the damper 15.

The terahertz wave generator 1 inspects the inspection target object O by using the terahertz wave TH as described above. To change the type of the inspection target object O, however, the wavelength of the terahertz wave L2 needs to be changed accordingly.

In this case, the controller 10 instructs the movement mechanism 22 to cause the movable stage 21 to move the first total reflection mirror 17 and the concave lens 6 by a required amount along the optical path of the seed beam L2. The first total reflection mirror 17 is thus located in a position where the phase matching condition for obtaining a terahertz wave TH after the change is satisfied. That is, the angle of incidence of the seed beam L2 is incident on the convex lens 7 as the light collecting lens is changed, so that the angle of incidence of the seed beam L2 incident on the end surface 4A via the second total reflection mirror 18 is changed.

Further, the wavelength of the seed beam L2 emitted from the seed beam emitter 3 is changed to a wavelength for generating the terahertz wave TH having the predetermined wavelength after the change.

As a result, a terahertz wave L2 according to the type of the inspection target object O after the change is generated with the phase matching condition satisfied.

In the present embodiment described above, the convex lens 7 as the collecting lens is disposed only at a single location, and the seed beam L2 is deflected by the beam guide means 5 and incident on the nonlinear crystal 4. Therefore, according to the present embodiment, a compact terahertz wave generator 1 with an inexpensive manufacturing cost can be provided.

Further, the beam guide means 5 includes the first total reflection mirror 17, which is movable in the horizontal direction along the optical path of the seed beam L2, and the second total reflection mirror 18, which is fixed in a predetermined position, and the single convex lens 7 collects the seed beam L2. Therefore, as compared with the apparatus described in Japanese Patent No. 3,747,319, in which an approximate value based on the diffraction grating is used to satisfy the phase matching condition, the present embodiment allows the phase matching condition to be satisfied for any wavelength, whereby the terahertz wave generator 1 can be provided as a wideband, variable wavelength terahertz wave generator.

Figure 3:
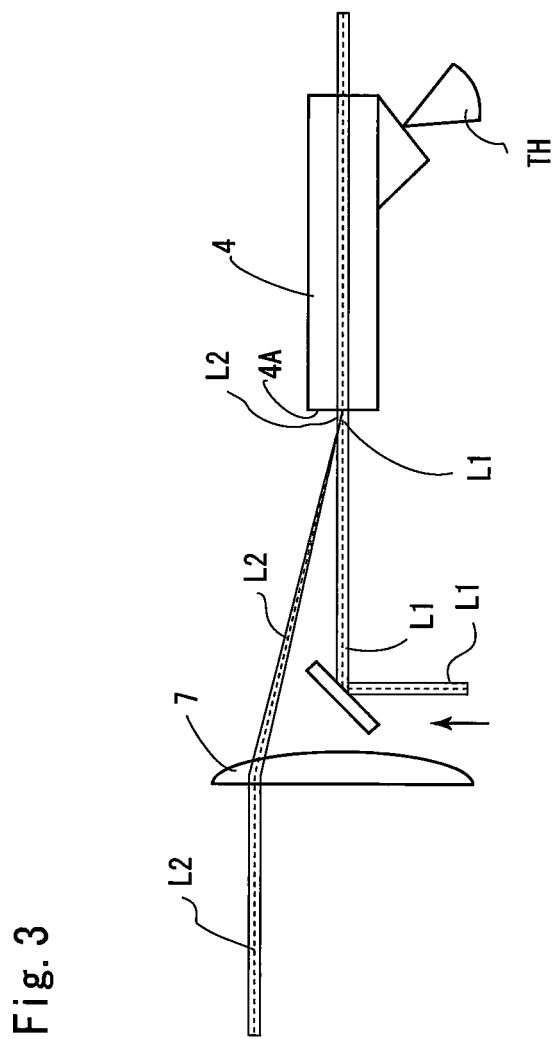
FIG. 3 is a configuration diagram showing related art.

Further, in the present embodiment, since the seed beam L2, the diameter of which has been increased by the concave lens 6, is collected and converted into a collimated beam by the convex lens 7 and caused to be incident on the end surface 4A, the diameter of the seed beam L2 incident on the end surface is increased as compared with the diameter of the seed beam L2 in the terahertz wave generator of related art (see FIGS. 2 and 3). As a result, the area where the pumping beam L1 and the seed beam L2 are superimposed on each other on the end surface 4A can be increased, whereby the intensity of the terahertz wave TH generated by the nonlinear crystal can be higher than the intensity of the terahertz wave generated by the terahertz wave generator of related art. Therefore, a result of the inspection of the inspection target object O can be readily evaluated, whereby whether or not the quality of the inspection target object O is accepted can be reliably determined.

As the method for inspecting the inspection target object O by using the terahertz wave generator 1, the same inspection target object O may be irradiated with the terahertz wave TH by continuously changing the frequency of the terahertz wave TH from 0.8 to 3 THz. Irradiating the inspection target object O with the wavelength sweep described above allows inspection of substances characterized in that the wavelengths of the terahertz wave TH that is likely to be absorbed by the substances differ from one another (for example, a case where a substance A is characterized in that it absorbs terahertz wave of 1 THz and a substance B is characterized in that it absorbs a terahertz wave of 2 THz).

In the embodiment described above, the pumping beam emitter 2 and the seed beam emitter 3 are disposed so that the pumping beam L1 and the seed beam L2, immediately after it is emitted, are parallel to each other, but the angle of incidence of the seed beam L2 incident on the first total reflection mirror 17 can be changed as appropriate. In this case, the angles at which the first total reflection mirror 17 and the second total reflection mirror 18 are supported are adjusted so that the phase matching condition (phase matching angle) is satisfied.

In the embodiment described above, the concave lens 6 is disposed on the optical path of the seed beam L2 and in a position upstream of the convex lens 7, but the concave lens 6 may instead be disposed in a position downstream of the convex lens 7.

The first total reflection mirror 17 described above is not necessarily moved exactly along the optical axis (optical path) of the seed beam L2 immediately after it is emitted from the seed beam emitter 3. That is, the first total reflection mirror 17 may be moved along a path inclining with respect to the optical axis (optical path) of the seed beam L2 as long as the angle of reflection of the seed beam L2 reflected off the first total reflection mirror 17 is fixed. In this case, the position where the seed beam L2 is incident on the first total reflection mirror 17 is shifted when the first total reflection mirror 17 moves along the inclining path.

Further, in the embodiments described above, one convex lens 7 is disposed on the optical path of the seed beam L2. Instead, a plurality of convex lenses 7 may be disposed on the optical path.

Further, in the embodiment described above, the collimator 23 converts the seed beam L2 into a collimated beam, but the collimator 23 may be omitted. In this case, the seed beam L2 that is not a collimated beam immediately after the seed beam L2 is emitted from the seed beam emitter 3 is shaped by the concave lens 6 and the convex lens 7 so that the seed beam L2 is a collimated beam when it is incident on the end surface 4A.

REFERENCE SIGNS LIST

1 Terahertz wave generator
2 Pumping beam emitter
3 Seed beam emitter
4 Nonlinear crystal
4A End surface
5 Beam guide means
6 Concave lens
7 Convex lens
17 First total reflection mirror
18 Second total reflection mirror
22 Movement mechanism
L1 Pumping beam
L2 Seed beam
TH Terahertz wave

What is claimed is:

1. A terahertz wave generator comprising a nonlinear crystal capable of generating a terahertz wave based on a parametric effect, a pumping beam emitter that emits a pumping beam, a seed beam emitter that emits a seed beam, a convex lens disposed on an optical path of the seed beam and collecting the seed beam, a first collimator for adjusting a pumping beam emitted from the pumping beam emitter into a first collimated beam, a second collimator for adjusting a seed beam emitted from the seed beam emitter into a second collimated beam, a concave lens disposed between the seed beam emitter and the convex lens on the optical path of the seed beam, and a light guiding means for allowing the second collimated beam to pass the concave lens and thereafter, in parallel with an optical axis of the convex lens, to be incident on the convex lens, and moves the seed beam, with the concave lens, in a direction orthogonal to an optical axis of the convex lens, wherein the terahertz wave generator is configured so that the pumping beam and the seed beam are caused to be incident through an end surface of the nonlinear crystal to generate the terahertz wave and the second collimated beam, a diameter of which is increased by the concave lens and further collected by the convex lens, is caused to be incident on the nonlinear crystal so as to be superimposed on the first collimated beam on the end surface.

\* \* \* \* \*